US007472048B2

(12) United States Patent
Puckette

(10) Patent No.: US 7,472,048 B2
(45) Date of Patent: Dec. 30, 2008

(54) DIRECT DIGITAL DRIVE AUDIO SYSTEM AND METHOD

(75) Inventor: Robert Puckette, Corvallis, OR (US)

(73) Assignee: Trimble Navigation Limited, Sunnyvale, CA (US)

( * ) Notice: Subject to any disclaimer, the term of this patent is extended or adjusted under 35 U.S.C. 154(b) by 443 days.

(21) Appl. No.: 10/839,954

(22) Filed: May 5, 2004

(65) Prior Publication Data

US 2005/0192685 A1 Sep. 1, 2005

Related U.S. Application Data

(63) Continuation-in-part of application No. 10/770,647, filed on Feb. 2, 2004, now Pat. No. 7,287,154.

(51) Int. Cl.
*G06G 9/455* (2006.01)
*G06F 3/16* (2006.01)

(52) U.S. Cl. ............................... 703/6; 703/18; 700/94; 381/97; 381/120

(58) Field of Classification Search ..................... 703/6, 703/18; 700/94; 381/97, 120
See application file for complete search history.

(56) References Cited

U.S. PATENT DOCUMENTS 5,430,802 A * 7/1995 Page ........................... 381/96
5,909,496 A * 6/1999 Kishigami et al. .......... 381/111
5,956,411 A * 9/1999 Edgar .......................... 381/97
6,148,274 A * 11/2000 Watanabe et al. .............. 703/6
6,289,041 B1 * 9/2001 Krasner ...................... 375/152
6,716,103 B1 * 4/2004 Eck et al. ...................... 463/45
6,792,120 B1 * 9/2004 Szenics ...................... 381/120
2003/0225568 A1 * 12/2003 Salmonsen .................. 703/27
2004/0037371 A1 * 2/2004 Brennan ..................... 375/327
2004/0093099 A1 * 5/2004 Brennan ...................... 700/94

* cited by examiner

*Primary Examiner*—Thai Phan

(57) ABSTRACT

A direct digital drive audio system and method system and method are presented. The direct digital drive system and method utilizes a digital signal to directly drive the speakers. In one exemplary implementation, an audio system includes a sample register, an convergence adjustment component, an accumulated error register, a digital driver and a speaker. The sample register is coupled to the convergence adjustment component which is coupled to the accumulated error register and the digital driver which in turn is coupled to the speaker. The sample register holds an audio sample. The convergence adjustment component calculates the error for each sample. The accumulated error register stores an accumulated error. The digital driver determines whether to drive on a positive digital value, drive on a negative digital value or not drive. The speaker creates audio sounds based upon a signal from the digital driver.

12 Claims, 8 Drawing Sheets

DIRECT DIGITAL DRIVE AUDIO SYSTEM AND METHOD

RELATED APPLICATIONS

This application is a Continuation in Part of commonly assigned, copending U.S. application Ser. No. 10/770,647 Feb. 02, 2004 entitled "AN ELECTRONIC BOOT UP SYSTEM AND METHOD", which is incorporated herein in its entirety by reference.

BACKGROUND OF THE INVENTION

1. Field of the Invention

The present invention generally relates to audio systems. More particularly, the present invention relates to the field of driving speakers in an audio system to produce sound.

2. Related Art

Electronic systems and circuits have made a significant contribution towards the advancement of modern society and are utilized in a number of applications to achieve advantageous results. Numerous electronic technologies such as digital computers, audio devices, video equipment, and telephone systems have facilitated increased productivity and reduced costs in analyzing and communicating data in most areas of business, science, education and entertainment. Frequently, these advantageous results are realized through the use of audio systems that convey information via audio sounds. The type of audio system can have significant impacts on the performance and quality of the sound.

Audio systems usually include speakers for creating sound. Speakers typically create sound by vibrating a speaker cone (e.g., moving a speaker cone in and out) in accordance with inflections in an analog signal. Speakers are typically driven with an analog signal that corresponds to a sound waveform. Traditionally, the analog signal is applied to the terminals of the speaker which produce magnetic fields that push or pull the speaker cone to move in and out. The movement of the speaker cone displaces a volume of air producing sound waves. The amount of movement of the speaker cone and resulting air displacement is typically determined by the relative amplitude or voltage level of the analog signal. The analog signal voltage is usually amplified by an amplification component before the signal is forwarded to a speaker input.

Achieving high sound quality and fidelity in analog audio systems can be difficult. Even though some analog systems may involve pulse width modulation (e.g., Class D amplification) they typically require dedicated special-purpose hardware in addition to system logic components (e.g., a digital to analog converter). Components dedicated to special functions typically consume system resources (occupy precious board space) and add costs. Coordinating additional connections and interactions can also complicate design efforts. In addition, the analog circuits used in a traditional audio system can consume a significant amount of power.

SUMMARY OF THE INVENTION

A direct digital drive audio system and method are presented. The direct digital drive system and method utilizes a digital signal to directly drive the speakers. In one embodiment, a direct digital drive audio system and method facilitates reduction of special purpose hardware. For example, a direct digital drive audio system and method of the present invention does not require a digital to analog converter. Embodiments of the present invention are also compatible with sophisticated error techniques to ensure that noise errors in the signal are removed.

In one exemplary implementation, an audio system includes a sample register, a convergence adjustment component, an accumulated error register, a digital driver and a speaker. The sample register is coupled to the convergence adjustment component which is coupled to the accumulated error register and the digital driver which in turn is coupled to the speaker. The sample register holds an audio sample. The convergence adjustment component calculates the error for each sample. The accumulated error register stores an accumulated error. The digital driver determines whether to drive on a positive digital value, drive on a negative digital value or not drive. The speaker creates audio sounds based upon a signal from the digital driver.

BRIEF DESCRIPTION OF THE DRAWINGS

The accompanying drawings, which are incorporated in and form a part of this specification, illustrate embodiments of the invention and, together with the description, serve to explain the principles of the present invention. The drawings referred to in this description should not be understood as being drawn to scale except if specifically noted.

DETAILED DESCRIPTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their Work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "computing," "translating," "instantiating," "determining," "displaying," "recognizing," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices.

Figure 1:
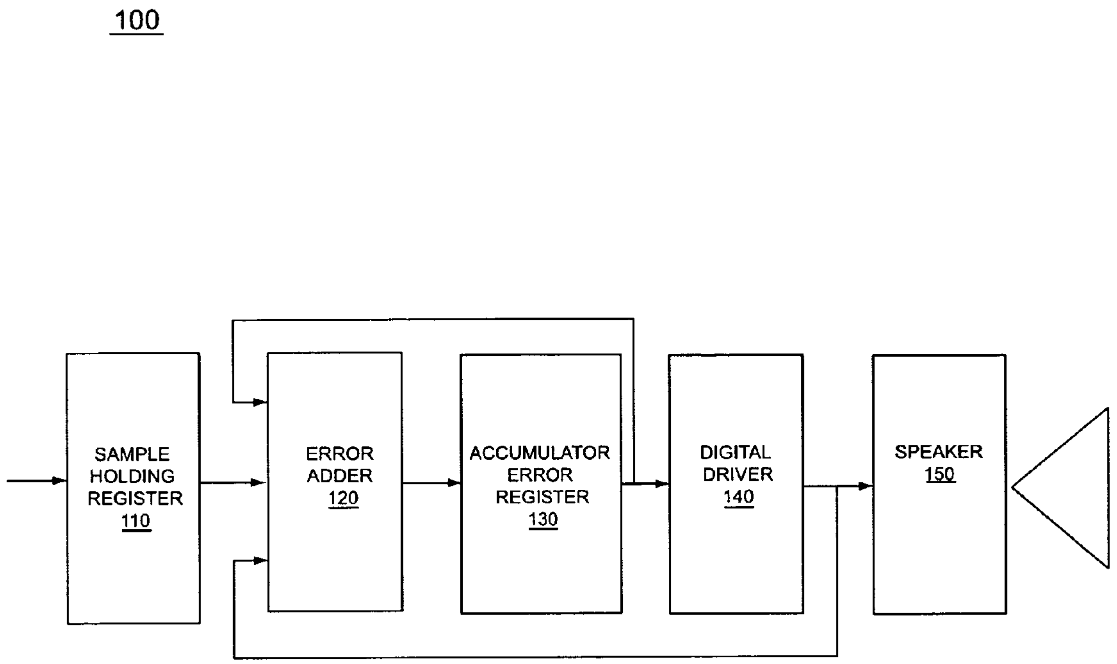
FIG. 1 is a block diagram of an audio system in accordance with one embodiment of the present invention.

FIG. 1 is a block diagram of audio system 100 in accordance with one embodiment of the present invention. Audio system 100 utilizes a digital signal to directly drive audio speakers. Embodiments of the present invention are also compatible with sophisticated error coordination techniques to ensure that error noise in the signal is removed. By driving a speaker directly with a digital signal, audio system 100 also facilitates reduction of special purpose hardware. For example, audio system 100 does not require a digital to analog converter. Audio system 100 comprises sample register 110, convergence adjustment component 120, accumulated error register 130, digital driver 140 and speaker 150. Sample register 110 is coupled to convergence adjustment component 120 which is coupled to accumulated error register 130 and digital driver 140 which in turn is coupled to the speaker 150.

The components of audio system 100 cooperatively operate to create sound by directly diving a speaker with a digital signal. The components of audio system 100 are clocked at a speaker drive clock rate. The speaker drive clock rate is much faster than the audio sample rate. In one exemplary implementation, the speaker drive clock rate is orders of magnitude faster than the audio sample rate. The audio sample rate is the rate at which an audio signal is sampled at. In one embodiment of the present invention, for each speaker drive clock period speaker 150 is driven in accordance with one of three possible states. The first drive state is to drive or "push" the speaker cone outward. The second drive state is to drive or "pull" the speaker cone inward. The third drive state is to not drive or "not move" the speaker cone.

The sample register 110 holds an audio level sample (e.g., for a sample period). In one embodiment, the audio sample is a digitized sample associated with an analog sound wave. In one exemplary implementation, the audio sample value corresponds to a percentage of the maximum value of an audio signal amplitude.

With reference still to FIG. 1, the convergence adjustment component 120 adjusts a deviation or "error" value each clock cycle. In one embodiment, adjustments are made in accordance with delta-sigma techniques. In one exemplary implementation, the convergence adjustment component is a free input adder that adds a previous error value to a new error value. The new error can be determined by subtracting the input to the adder from the output of the adder.

The accumulated error register 130 stores an accumulated deviation or error value. In one embodiment, the accumulated error register 130 accumulates error deviation values over multiple clock cycles. For example, the output of convergence adjustment component 120 is fed into accumulated error register 130 after adjustments are made to the error value for each clock cycle.

The digital driver 140 dives a digital signal to speaker 150. Digital driver 140 also determines whether to drive a positive digital value, drive a negative digital value or not drive a value to speaker 150. In one embodiment digital driver 140 drives a digital signal at a direct current (DC) voltage level and determines what voltage level to drive a digital signal at. For example, whether to drive a digital voltage signal at a voltage level associated with a positive logical one value, a negative logical one value or zero logic value. In one exemplary implementation the driver 140 includes a first output and a second output. The first output is driven high and the second output is grounded for a positive logical one drive value. The second output is driven high and the first output is grounded for a negative logical one drive value. The first output and the second output are grounded for a zero logical drive value.

Referring still to FIG. 1, the speaker 150 creates audio sounds based upon a digital signal from the digital driver 140. Speaker 150 is driven directly from the digital signal. In one embodiment speaker 150 is communicatively coupled between two digital outputs of digital driver 140 permitting both positive and negative differential signals to be applied to the speaker 150. In one embodiment of the present invention the negative and positive differential signals correspond to the positive logical one drive value and the negative logical one value from digital driver 140.

In an alternate embodiment, speaker 150 comprises a first speaker lead and a second speaker lead which are alternatively coupled to the first output of digital driver 140 and the second output of digital diver 140 depending upon the cumulative error. Intermediate values can be achieved by pulsing the digital signal on the first lead and second lead.

Figure 2:
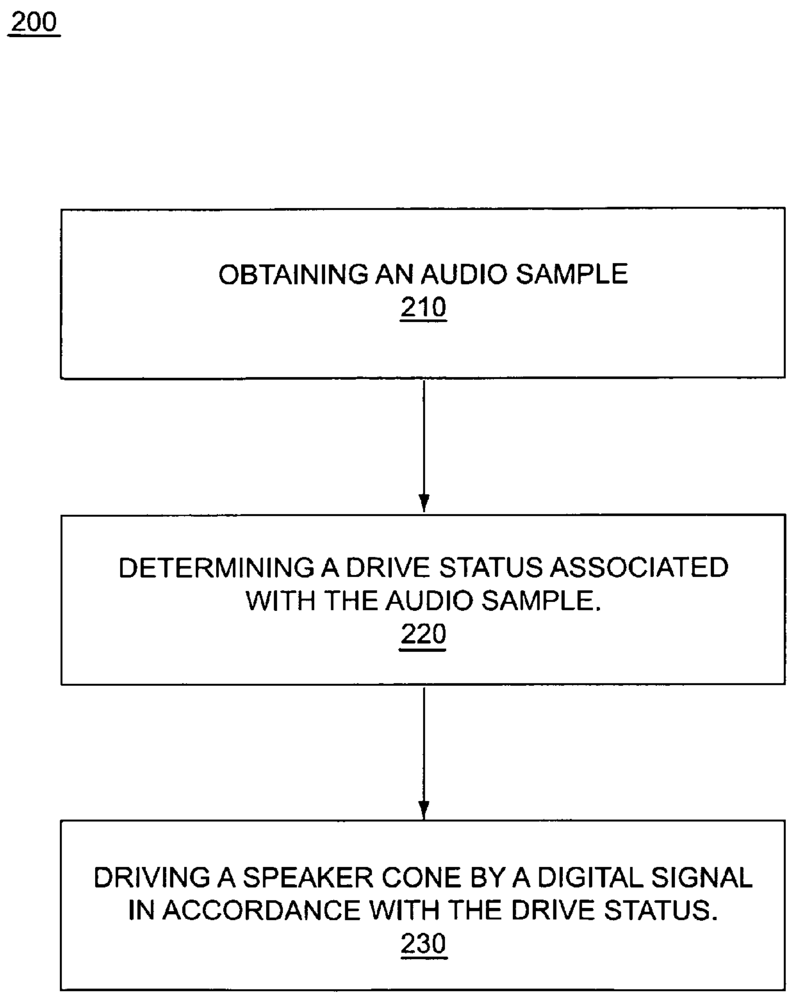
FIG. 2 is a flow chart of an audio method in accordance with one embodiment of the present invention.

FIG. 2 is a flow chart of audio method 200 in accordance with one embodiment of the present invention. Audio method 200 drives a speaker directly with a digital signal. In one embodiment of the present invention, the frequency of the pulses on the digital signal are much faster than the mechanical aspects of the speaker can react to on an individual basis and the physical inertia response characteristics of the speaker cone and air operate to average out a sequence of the digital signal pulses.

In step 210, an audio level sample is obtained. In one embodiment of the present invention, an audio level sample includes a digitized representation of an analog audio waveform sample. For example, a percentage of a maximum analog audio waveform amplitude level expressed in binary or digital format. In one exemplary implementation, the digital representation (e.g., a sequence of bits comprising logical ones and logical zeros) is obtained from a processor and/or a memory. In one exemplary implementation the processor and memory are booted up by a boot up method performing a read only memory (ROM) emulation process (e.g., in a system that utilizes ROM emulation to store bootstrap instructions).

A drive status associated with the audio sample is determined at step 220. In one embodiment of the present invention, the drive status is determined for each speaker drive clock cycle. The speaker drive clock rate can be selected to be much faster (e.g., multiples or orders of magnitude faster) than the sample clock rate relative to one another. In one exemplary implementation the drive status corresponds to a duty cycle. In one embodiment, a delta-sigma technique is utilized in the determination of the drive status (e.g., by resolving errors associated with the audio sample). In one embodiment, determining an error includes adding a previous error to a new error to provide a cumulative error. The new error can be determined by subtracting a system "input error" (e.g., an audio sample value input to the system) from a system "output error" (e.g., a digital value used to drive a speaker).

In step 230, a speaker cone is driven by a digital speaker drive signal in accordance with the drive status. For example, a speaker cone is pushed out, pulled in or unaltered in accordance with the digital voltage level and polarity of the drive signal. In one embodiment of the present invention, a first speaker lead and a second speaker lead (e.g., speaker leads of speaker 150) are alternatively coupled to the first output and the second output of a digital driver (e.g., digital driver 140) depending upon the cumulative error. Intermediate values can be achieved by pulsing the first lead and second lead.

In one embodiment a speaker drive signal can be driven to a voltage level corresponding to positive digital value, a negative digital value or a zero logical. In one exemplary implementation, the speaker drive signal is derived from two digital signals permitting both negative and positive differential signals to be applied to the speaker. For example, when an error is more than 1 the output is driven to a −1 and when the error less than −1 the output is driven to 1. For example, if the digital sample is 0.25 the errors for each driver dock cycle are a multiple of 0.25 until the threshold is crossed (e.g., −0.25, −0.50, −0.75 and 0.0). The digital speaker signal would be 0,0,0,1 and on the positive speak lead and 0,0,0,0, on the negative terminal. This resulting average speaker voltage of 0.25 corresponds to the digital sample.

Figure 3:
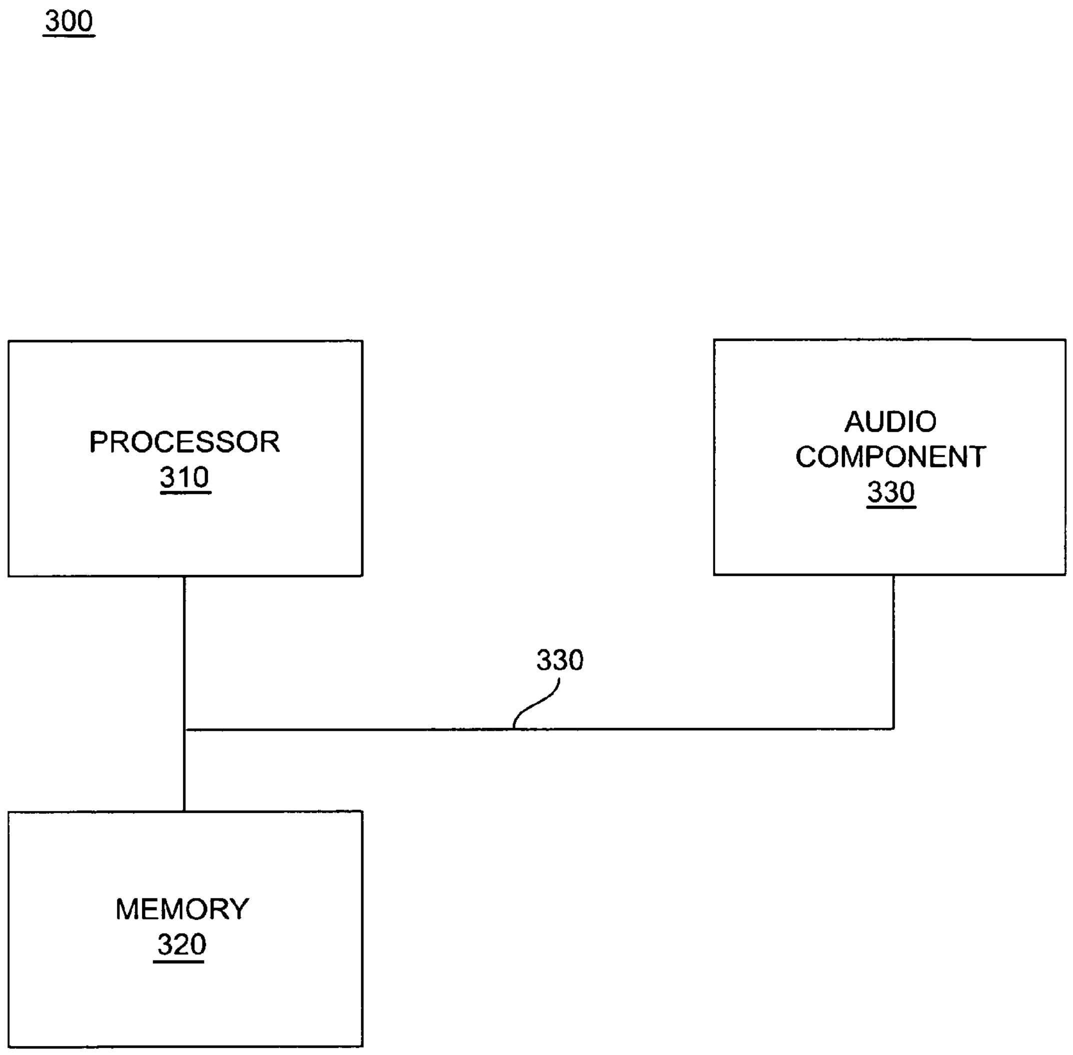
FIG. 3 is a block diagram of an exemplary information processing system in accordance with one embodiment of the present invention.

FIG. 3 is a block diagram of information processing system 300 in accordance with one embodiment of the present invention. Information processing system 300 comprises a processor 310, memory 320, bus 330 and audio system 340. Bus 330 is coupled to processor 310, memory 320 and audio system 340. Bus 330 communicates information between processor 310, memory 320 and audio component 330. Processor 310 processes the information. In one exemplary implementation processor 310 provides audio samples to audio system 340. Memory 320 makes information (e.g., audio information) available to processor 310 including audio information. Audio system 340 creates sound by driving a speaker with digital signals directly. For example, audio system 340 can create sounds by implementing audio method 200. In one embodiment, audio system 340 is similar to audio system 100.

Figure 4:
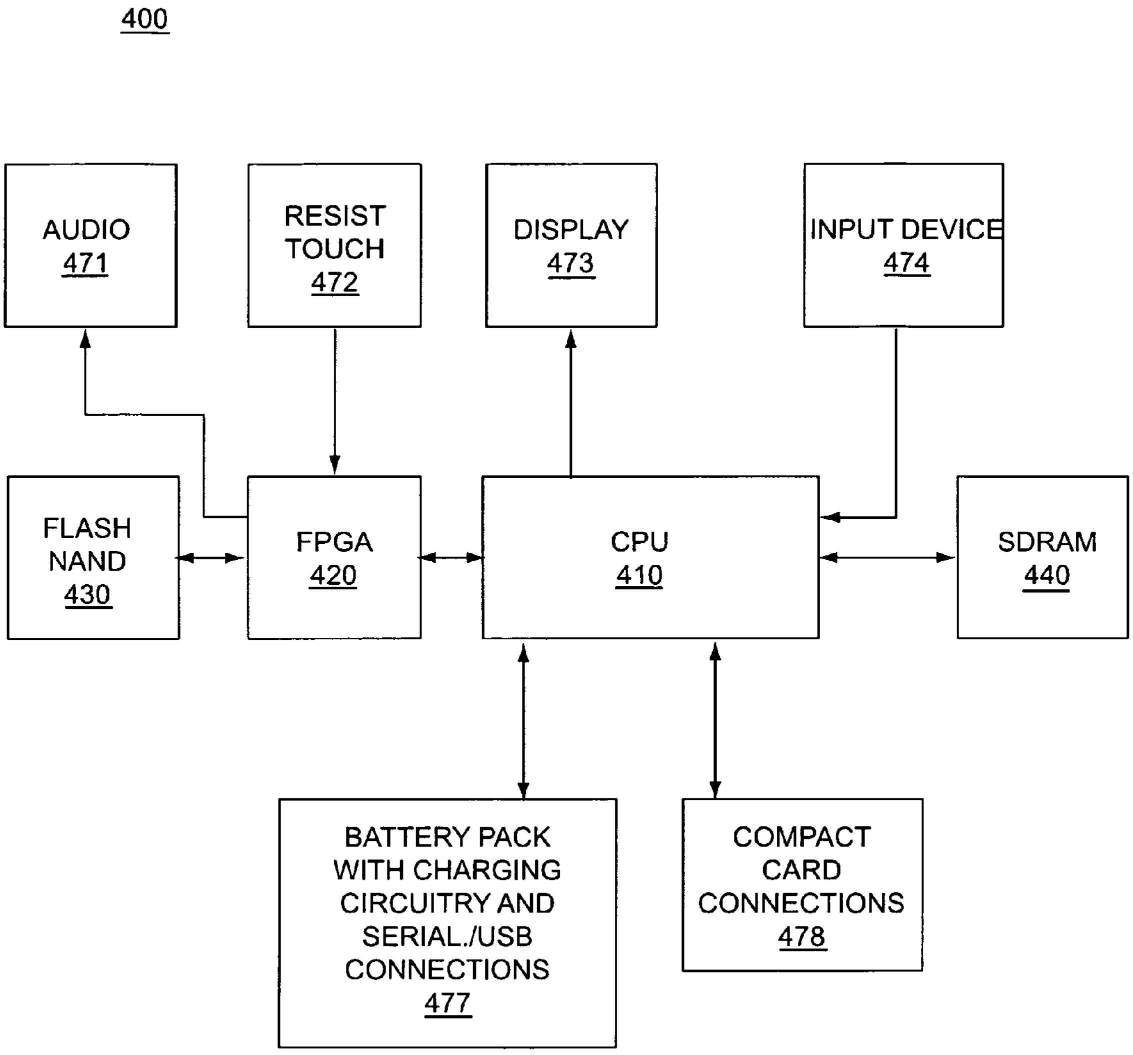
FIG. 4 is a block diagram of an architecture in accordance with one embodiment of the present invention

FIG. 4 is a block diagram of architecture 400 in accordance with one embodiment of the present invention. Architecture 400 can be utilized to perform a variety of functions, including audio functions, display functions, GPS functions, etc. Architecture 400 includes central processing unit (CPU) 410, field programmable gate array 420, NAND flash 430, synchronous dynamic random access memory (SDRAM) 440, audio component 471, resistive touch component 472, display 473, input device 474, battery pack with charging circuitry and serial/universal serial bus (USB) connections 474 and compact card connections 478. CPU 410 is communicatively coupled to field programmable gate array 420, synchronous dynamic random access memory (SDRAM) 440, display 473, input device 474, battery pack with charging circuitry and serial/universal serial bus connections 474 and compact card connections 478. Field programmable gate array 420 is communicatively coupled to NAND flash 430, audio component 471, and resistive touch component 472.

The components of architecture 400 cooperatively operate to provide a variety of functions. Central processing unit (CPU) 410 processes information, including audio information. Synchronous dynamic random access memory (SDRAM) 440 stores information for processing by CPU 410, including audio information. Field programmable gate array 420 provides ROM emulation controller component functions and controls audio component 471 and resistive touch component 472. NAND flash 430 provides non-volatile memory storage for a variety of functions, including ROM emulation, audio functions and resist touch functions. NAND flash 430 can also provide storage for operating system instructions. Audio component 471 performs audio functions (e.g., similar to audio method 200). In one embodiment of the present invention, audio component 471 drives a speaker directly with a digital signal (e.g., similar to audio system 100). Resistive touch component 472 provides resistive touch functions. Display 473 performs display operations. Input device 474 enables information to be input to architecture 400. For example, input device 474 can be a cursor control component. Battery pack with charging circuitry and serial/universal serial bus connections 474 provide mobile power to components included in architecture 400 and communication of information via serial and universal serial bus connections. Compact card connections 478 enables various compact cards to be communicatively coupled to architecture 400.

In one embodiment of the present invention, architecture 400 performs direct digital signal speaker drive operations (e.g., audio method 200). For example, CPU 410 obtains audio information from NAND flash 430 via FPGA 420. In one exemplary implementation, audio component 471 is similar to audio system 100. In an alternate exemplary embodiment, field programmable gate array 420 provides audio control functions. For example, field programmable gate array 420 implements functions similar to sample register 110, convergence adjustment component 120, accumulated error register 130, and digital driver 140 to produce digital drive signals that drive a speaker similar to speaker 150 included in audio component 471. In one embodiment NAND flash 430 provides storage for audio information (e.g., digitized audio sample information).

Figure 5:
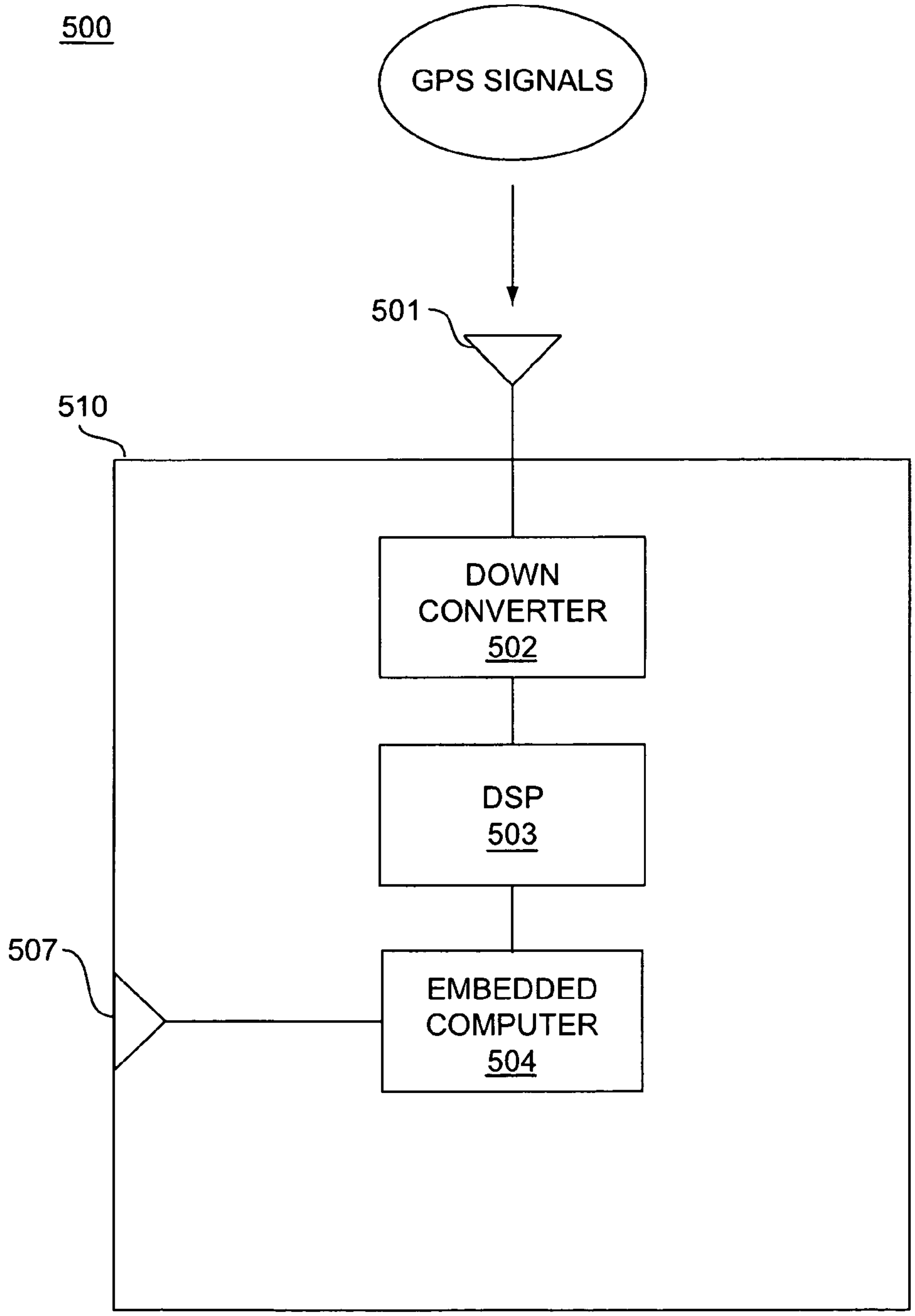
FIG. 5 is a block diagram of global positioning system (GPS) receiver in accordance with one embodiment of present invention.

Referring now to FIG. 5, a block diagram of global positioning system (GPS) receiver 510 in accordance with one embodiment of present invention is shown. GPS receiver 510 is designed to communicate with GPS satellites arranged in a GPS constellation. In one embodiment of the present invention the GPS satellites of the constellation are located in six orbital planes, four satellites in each plane, having an inclination of 55 degrees relative to the equator and an altitude of approximately 20,200 km (10,900 miles). The orbiting GPS satellites each broadcasts spread-spectrum microwave signals encoded with positioning data. The signals can be broadcast on two frequencies (e.g., L1 at 1575.42 MHz and L2 at 1227.60 MHz). Essentially, the signals can be broadcast at precisely known times and at precisely known intervals and encoded with their precise time of transmission. A user receives the signals with a GPS receiver (e.g., GPS receiver 510) designed to determine an exact time of arrival of the signals and to demodulate the satellite orbital data contained therein. Using the orbital data, the GPS receiver 510 determines the time between transmission by the satellite and reception by the receiver and uses this information to determine a pseudo-range measurement of that satellite. By determining the pseudo-ranges of four or more satellites, GPS receiver 510 is able to determine its precise location in three dimensions, velocity, and a time offset which is used to generate a very precise time reference.

Referring to FIG. 5, GPS receiver 510 comprises antenna 501, down converter 502, digital signal processor (DSP) 503, internal embedded computer 504, and communications port 507. Internal embedded computer 504 is coupled to communications port 507 and DSP 503 which is coupled to down converter 502. Down converter 502 is coupled to antenna 510. GPS receiver 510 receives GPS signals via antenna 501. The GPS signals are down converted via down converter 502, then de-spread and demodulated by DSP 503. DSP 503 passes the information to an internal embedded computer 504, which computes the correct pseudo ranges and determines the GPS-based position and velocity. Embedded computer 504 includes a direct digital drive audio system (e.g., similar to audio system 100) for driving a speaker directly with a digital signal. In one embodiment of the present invention, the information can be communicated to the user via the audio system. In one exemplary implementation, embedded computer 504 includes a ROM emulation system (e.g., ROM emulation system 300) for storing bootstrap information. Embedded computer 504 can be boot up by accessing information in the ROM emulation system (e.g., in accordance with ROM emulation method 700).

In one embodiment of the present invention, the information can be communicated to the user via an optional display (not shown) coupled to the embedded computer. Communications port 507 couples GPS receiver 510 to a bus and provides a communication path for navigation information (e.g. off line, off heading information, etc.). In one embodiment of the present invention GPS receiver 510 includes an input/output component (not shown) as an additional means for communicating information (e.g., configuration information, navigation information, etc.).

It should be appreciated that GPS receiver 510 can be implemented as a differential GPS receiver (DGPS), which provides greater accuracy. To improve the accuracy of GPS determined PVT, differential GPS systems have been developed and widely deployed. As is well known, differential GPS functions by observing the difference between pseudo range measurements determined from the received GPS signals with the actual range as determined from the known reference station point. The DGPS reference station determines systematic range corrections for all the satellites in view based upon the observed differences. The systematic corrections are subsequently broadcast to interested users having appropriate DGPS receivers. The corrections enable the users to increase the accuracy of their GPS determined position. Differential correction broadcasts are currently in wide use throughout the world. Tens of thousands of DGPS receivers have been built and are in operation.

Alternatively, it should be appreciated that GPS receiver 510 can also be implemented as an RTK (real-time kinematics) GPS receiver. RTK is an even more accurate technique for improving the accuracy of GPS. RTK involves the use of two or more GPS receivers which are coupled via a communications link (usually RF based). The GPS receivers are spatially separated and communicate to resolve ambiguities in the carrier phase of the GPS signals transmitted from the GPS satellites. The resulting carrier phase information is used to determine an extremely precise position (e.g., within 2 to 3 centimeters).

A present invention digital drive audio system and method can be implemented in a system that is booted up by an electronic bootup system that utilizes ROM emulation to store bootstrap instructions. In one embodiment, a ROM emulation system and method enables an electronic system to start up without separate ROM memory for storing bootstrap information. Present invention ROM emulation can interpret a ROM compatible fetch request, retrieve the information from a non-ROM memory (e.g., a NAND flash), and return the information in reply compatible with the fetch request. In addition, ROM emulation components can be utilized to perform other functions, providing control for other functions (e.g., touch screen control, audio control, etc.) and storing additional information for in the memory utilized for ROM emulation.

Figure 6:
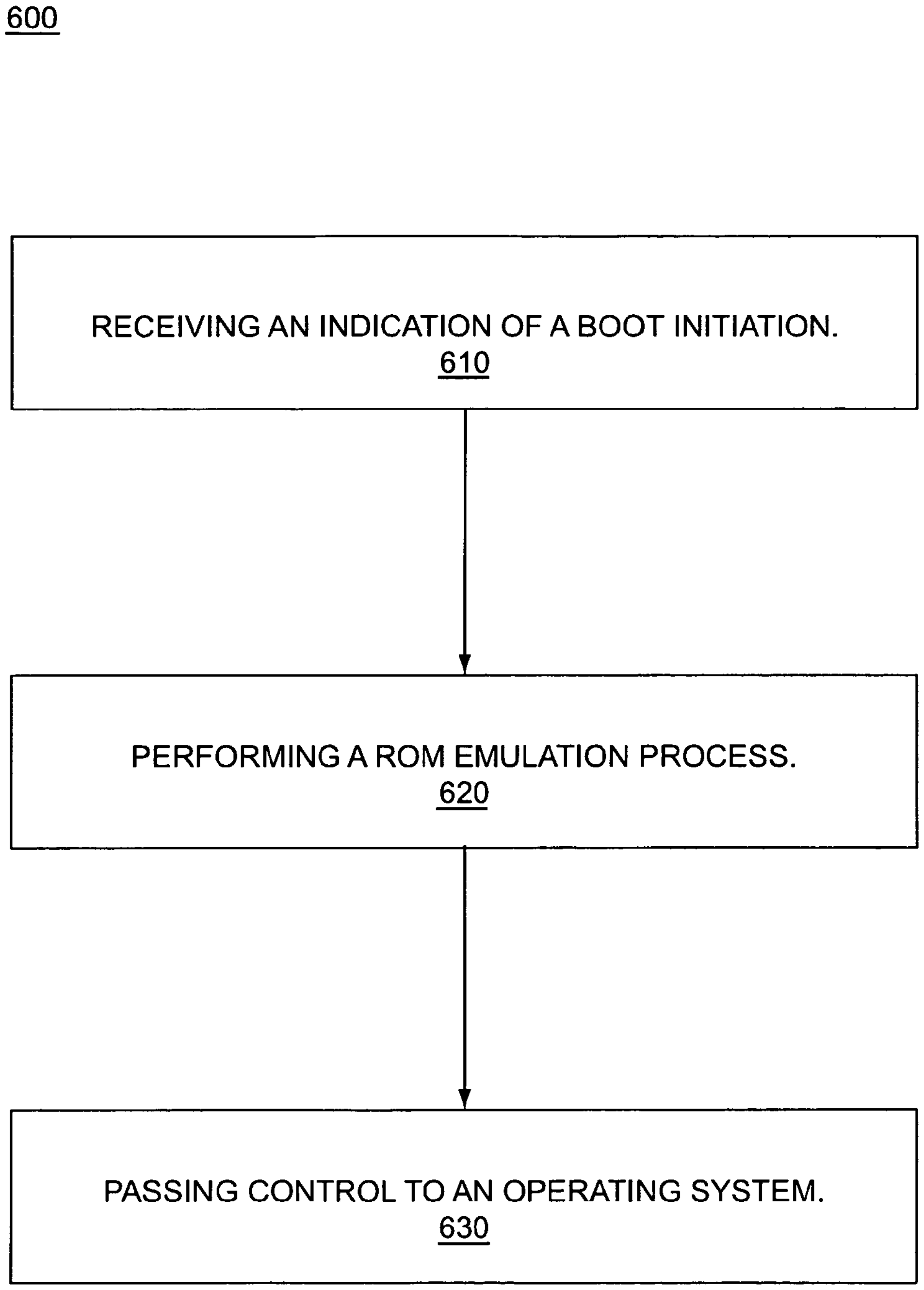
FIG. 6 is a flow chart of an electronic processing boot up method in for booting up a system in accordance with one embodiment of the present invention.

FIG. 6 is a flow chart of electronic processing boot up method 600 in accordance with one embodiment of the present invention. Electronic processing boot up method 600 permits electronic systems to be "booted up" using ROM emulation. The ROM emulation utilizes minimal or no ROM to emulate a separate ROM memory. It is appreciated that electronic processing boot up method 600 can be implemented in a different systems and is compatible with a variety of non-ROM memories.

In step 610, an initial memory fetch is initiated. In one embodiment of the present invention, the initial memory fetch is initiated in response to an indication of a bootstrap launch. In one embodiment, an indication of a bootstrap triggering event (e.g., the power is turned on for a computer system, a reset switch is pressed and/or a software restart instructions are executed, etc.) is received and an initial memory fetch is initiated. In one exemplary implementation the initial memory fetch is for information at logical memory address zero of a system.

In step 620, a read only memory (ROM) emulation process is performed. The ROM emulation permits a component to issue ROM protocol compatible information fetch requests and access information in a different type of memory. In one embodiment, a ROM emulation process interprets a ROM compatible fetch request, retrieves the information from a non-ROM memory (e.g., a NAND flash), and returns the information in a reply compatible with the fetch request. For example, a fetch request from a processor for bootstrap information at logical memory address location zero is interpreted, the bootstrap information is retrieved from a NAND flash memory location, and the bootstrap information is returned to the processor in a reply format compatible with the fetch request (e.g., a format the processor can handle).

Figure 7:
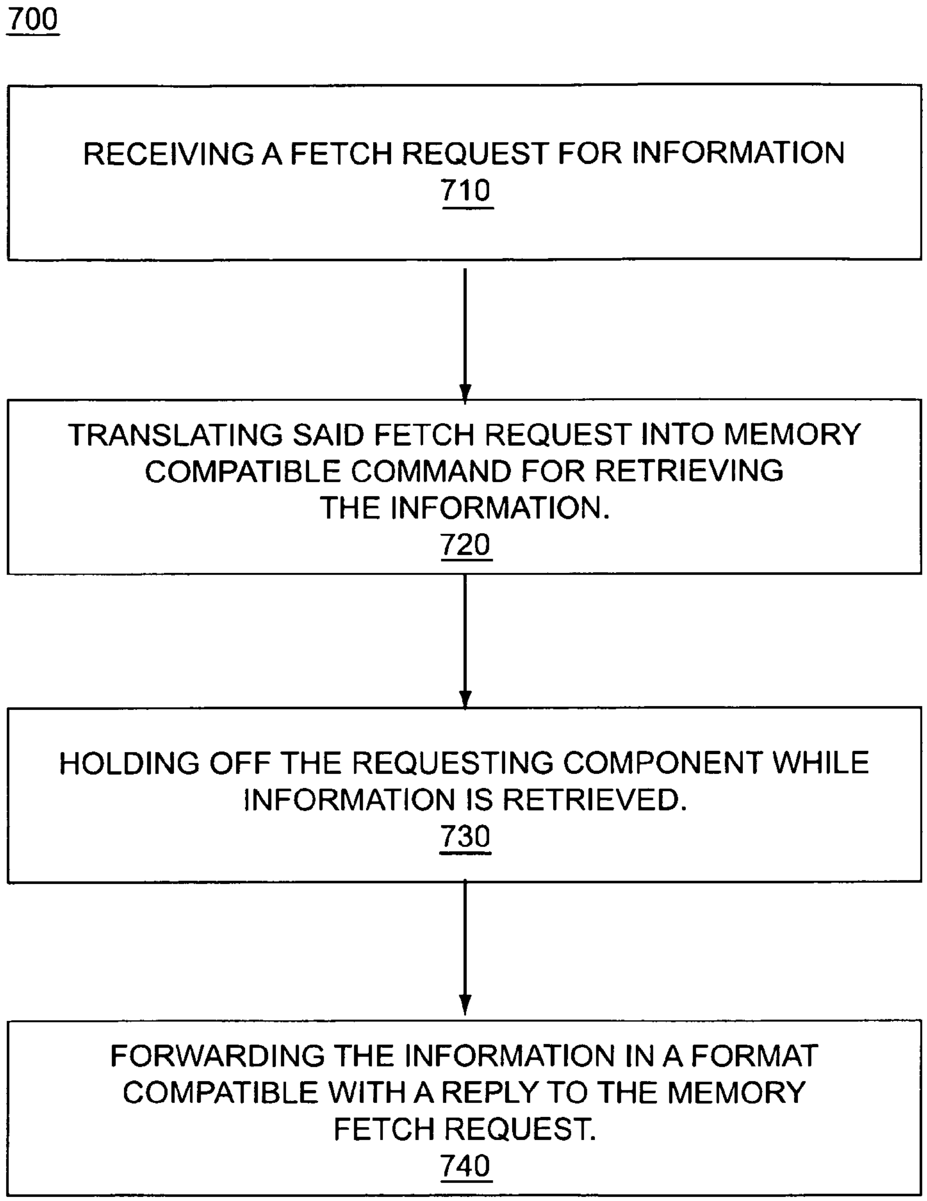
FIG. 7 is a flow chart of a read only memory (ROM) emulation process for use in a system in accordance with one embodiment of the present invention.

FIG. 7 is a flow chart of read only memory (ROM) emulation process 700 in accordance with one embodiment of the present invention. ROM emulation process 700 is compatible with a variety of ROM fetch request protocols. It is appreciated that ROM emulation process 700 can be implemented with a variety of non-ROM memories (e.g., NAND flash, peripheral disk, etc.).

In step 710, a fetch request for information is received from a component (e.g., a processor). In one embodiment of the present invention the fetch request is received by a ROM emulation system. For example, processor fetch requests related to initial bootstrap operations are received by a ROM emulation system. A processor can issue a fetch request for information from a logical memory address location zero and the fetch can be forwarded to a ROM emulation system.

At step 720, the fetch request is translated into memory compatible commands for retrieving the information. In one embodiment of the present invention, the memory commands are compatible with a NAND flash memory. For example, the translating includes translating a ROM memory access fetch request into NAND flash memory compatible commands.

The NAND flash memory commands include commands directing retrieval of the information from a NAND flash memory.

With reference still to FIG. 7, the requesting component (e.g., processor) is held off while the information is retrieved in step 730. In one exemplary implementation, the processor is held off by a ready handshake protocol. For example, a ready signal is de-asserted in response to the fetch request and the ready signal is asserted when the information is in a format compatible with a reply to the memory fetch request. In another exemplary implementation, the processor is held off by issuing non-operation (NOP) instruction op-codes.

In step 740, the information is forwarded in a format compatible with a reply to the memory fetch. For example, information retrieved in accordance with a "serial" memory command protocol (e.g., an address is provided to a memory and data is returned on the same lines) and converted to a processor compatible parallel protocol (e.g., address and data are sent in parallel.). In one exemplary implementation, information is retrieved in step 720 sequentially (e.g., via multiplexing) and converted for parallel forwarding to a processor (e.g., via de-multiplexing).

In one embodiment of the present invention, the instructions from the non-ROM memory (e.g., NAND Flash memory) include RAM initialization instructions to initialize or "turn on" a RAM. Information from the non-ROM memory is copied to the RAM, including bootstrap information. In one exemplary implementation, the balance of bootstrap information is retrieved from RAM once the RAM has been initialized and the information copied from the NAND flash memory. In one exemplary implementation, initializing the RAM and copying the balance of the bootstrap information relatively early in the boot up process can permit the remainder of the boot process to proceed faster since information is retrieved directly from the RAM once it is initialized. The bad pages of the NAND flash memory can be marked and skipped when copying information from the non-ROM memory (e.g., the NAND flash).

Referring again to FIG. 6, control is passed to an operating system in step 630. In one embodiment of the present invention the operating system information is also downloaded from the non-ROM memory to the RAM. The present invention is compatible with a variety of systems using different operating systems. A system can be capable of performing a variety of functions, including a direct drive audio method (e.g., audio method 200). The functions can be implemented in a variety of systems including audio system 100 and processing system 300.

Figure 8:
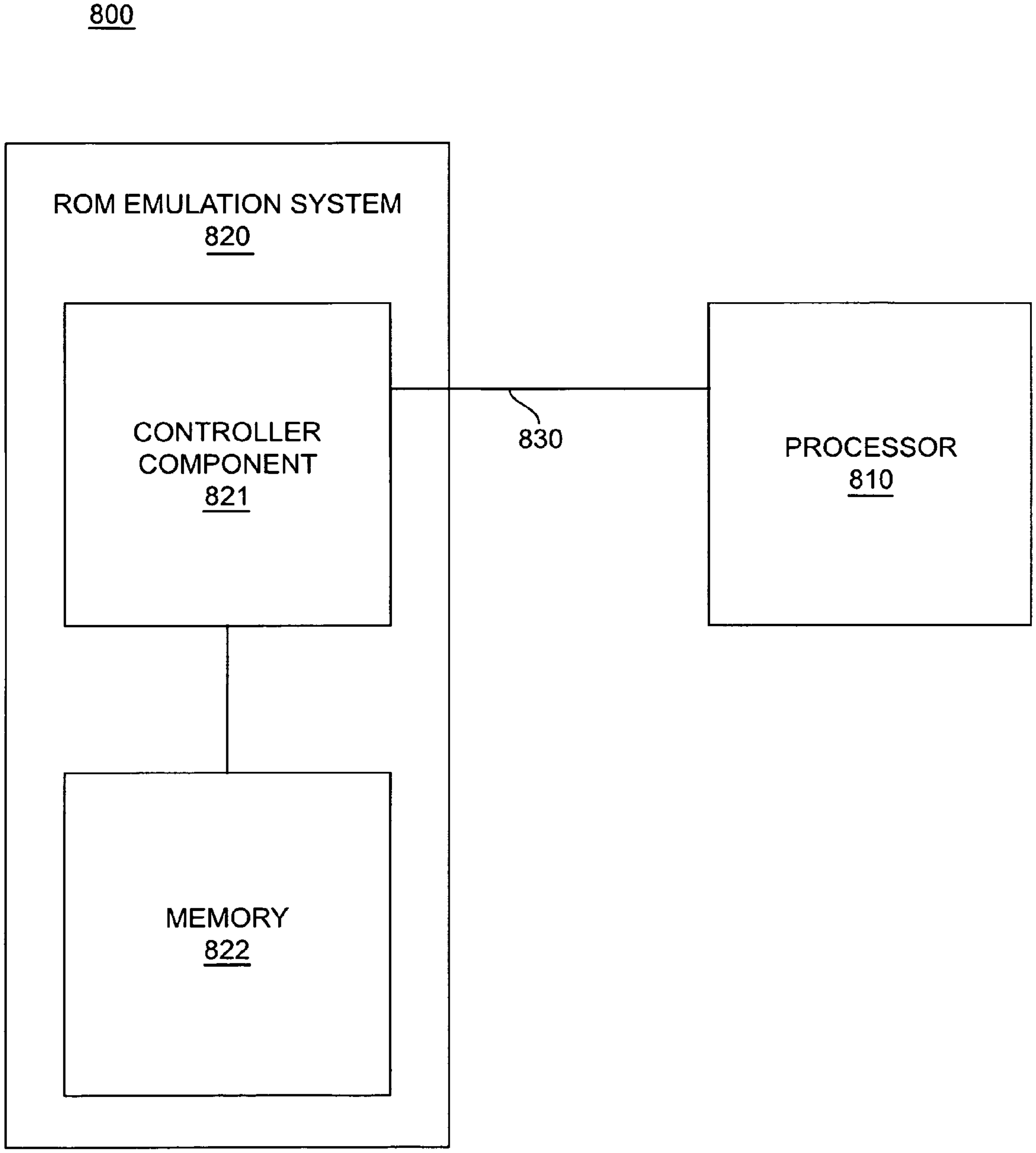
FIG. 8 is a block diagram of electronic processing boot up system included in exemplary embodiments of the present invention.

FIG. 8 is a block diagram of electronic processing boot up system 800 in accordance with one embodiment of the present invention. Electronic processing boot up system 800 comprises a processor 810, ROM emulation system 820 and bus 830. Bus 810 is coupled to processor 810 and ROM emulation system 820. Bus 810 communicates information between processor 810 and ROM emulation system 820. Processor 810 processes the information. ROM emulation system 820 makes information (e.g., bootstrap information) available to processor 810.

In one embodiment of the present invention, ROM emulation system 820 comprises controller component 821 and memory 822. ROM emulation system 820 utilizes various types of non-ROM memory to emulate a ROM memory. In one exemplary implementation, memory 822 is a NAND Flash memory (e.g., storing boot up information) and ROM emulation system 820 utilizes the NAND Flash memory to emulate a ROM memory. Controller component 821 interprets fetch requests from processor 810, generates commands for retrieving boot up information from the NAND flash memory (e.g., 822) and forwards the boot up information to the processor 810 in a format compatible for replies to the processor. The commands generated by controller component 821 are compatible with the NAND flash memory protocol for retrieving information.

It is appreciated that controller component 821 is readily adaptable for a variety of system configurations. For example, controller component 821 can be configured to interpret fetch requests from a variety of different requesting components including processors. In addition, controller component 821 can be configured to interact with a variety of non-ROM memories (e.g., NAND flash, peripheral disk, etc.).

In one embodiment of the present, controller component 821 includes a field programmable gate array, custom chip application specific integrated circuit (ASIC) and/or other digital logic system. The controller component 821 can implement a state machine for holding off the processor while interpreting a fetch request and assembling a memory retrieval instruction stream on the fly for retrieving information (e.g., boot up information) from memory 822 (e.g., NAND flash). For example, the state machine can direct ready handshake protocol responses to a fetch request.

In one embodiment, controller component 821 can include a small ROM memory integrated with the controller for storing a small amount of information for establishing handshaking protocols without storing other bootstrap information. Thus, the small ROM is much smaller than a traditional ROM that stores the bootstrap information. The integrated ROM does not consume addition board space or require additional board connections that a separate ROM chip otherwise would.

In one exemplary implementation, controller component 821 is accessible via a join test action group (JTAG) port (not shown) for directly controlling electrical signals in the electronic processing boot up system to effect programming of the NAND flash memory with the bootstrap loader and/or operating system. The JTAG port can be utilized to co-opt the functions of NAND flash lines and bring a system that is completely down (e.g., lost operating system, bootstrap loader instructions, etc.) back to functionality.

In an alternate embodiment of the present invention, electronic processing boot up system 800 can include a RAM (not shown). ROM emulation system 320 can provide boot up information to processor 810 until the RAM is initialized or "turned on". ROM emulation system 820 then provides the balance of boot up information to the RAM and processor 810 retrieves the balance of the boot up information from the RAM through interactions with the RAM (e.g., directly from the RAM). In one exemplary implementation of the present invention, operating system instructions are also copied to the RAM and control of the system is turned over to the operating system when the bootstrap operations are complete.

In one embodiment of the present invention, ROM emulation is performed in sequential phases, a micro loader phase, a state machine phase, a RAM copying phase, and a RAM implementation phase. A controller (e.g., a field programmable gate array) includes three memory areas or address ranges. A micro loader range (e.g., address 0 to 0-0x77) for initializing ROM emulation operations. The micro loader range can be implemented in a small ROM integrated with a ROM emulation controller component. A control register range (e.g., 0x78-0x7f) for permitting direct control of NAND flash memory. A state machine range (e.g., 0x80-0x7ff) for storing state machine based ROM emulation instructions. Access to this memory range can be converted to NAND flash commands appropriate for retching data at the request of a processor component.

The micro loader phase initializes ROM emulation operations. The mirco loader phase is primarily responsible for establishing ready handshaking operations to hold off a processor during ROM emulation. For example, a micro loader phase can include activation of a ready signal as an alternate function of a general purpose input/output (GPIO), allocation of a GPIO as an output for the auxiliary clock (AUCLK) function, turning on inputs, turning on an audio function (e.g., for clock the FPGA controller), setting a static memory bank to a slow specified width (e.g., 16 bit wide) variable latency memory, selecting a clock rate (e.g., 12 MHz) and jumping to a RAM initialization phase (e.g., to instructions at the memory range for the state machine instructions).

The state machine phase involves state machine based ROM memory emulation. Fetch requests are automatically converted to a sequence of NAND flash commands. In one exemplary implementation, the state machine phase can include turning a RAM on, turning on instruction caching, setting CPU speed, copying the state machine emulation code to RAM, and jumping to the RAM copy of the state machine emulation code.

The RAM copying phase involves copying the remainder of the bootstrap information from the ROM emulation system to RAM. The state machine approach can be discontinued and page accesses in manual mode can be performed. In one embodiment, direct control of a ROM emulation system memory (e.g., NAND flash memory) is provided (e.g., by a ROM emulation system controller component), including control of a read strobe line, chip enable line, write strobe line, command strobe line, address strobe line, chip ready status line, and chip write protect line. Bad pages in the NAND flash memory can be marked and skipped when copying the bootstrap information to the RAM. In one exemplary implementation, variable latency measures associated with the state machine phase (e.g., ready handshaking) can be disabled before manual control of the NAND flash is implemented.

The RAM implementation phase involves completing the bootstrap operations from the RAM. In one exemplary implementation, when the boot loader is fully operational additional operations can be performed. For example, a display can be turned on, operating system information can be copied to the RAM, a jump is made to the operating system, additional diagnostics can be performed, and features can be configured.

Thus, the present invention system and method enables an electronic system to perform audio functions by driving a speaker directly with a digital signal. Driving digital signals directly onto the audio speaker facilitates the reductions of special dedicated components (e.g., a digital to analog converter). Precious board space and connections on the board are conserved. The present invention system and method can also enable an electronic system to perform bootstrap operations with minimal or no ROM memory. Components included in a present ROM emulation system can also be utilized to provide a variety of other functions facilitating even greater conservation of resources.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An audio system comprising:

a sample register for holding an audio sample;

a convergence adjustment component for calculating an error for each sample, said convergence adjustment component communicatively coupled to said sample register;

an accumulated error register for storing an accumulated error, said accumulated error register communicatively coupled to said convergence adjustment component;

a driver for driving a digital signal to a speaker, wherein said driver determines whether to drive a positive digital value, drive a negative digital value or not drive a value to said speaker, said driver communicatively coupled to said accumulator error register; and said speaker for creating audio sounds based upon a signal from said driver, said speaker communicatively coupled to said driver.

2. An audio system of claim 1 wherein said audio sample is a digitized sample of an analog audio signal.

3. An audio system of claim 1 wherein said sample register holds said audio sample for a sample period.

4. An audio system of claim 1 wherein said convergence adjustment component is a free input adder that adds a previous error to a new error and said new error is determined by subtracting the input to the convergence adjustment component from the output of the convergence adjustment component.

5. An audio system of claim 1 wherein said speaker is communicatively coupled between two digital differential outputs permitting both negative and positive differential pulse signals derived by delta-sigma techniques to be applied to the speaker.

6. An audio system of claim 1 wherein said driver includes a first output and a second output wherein:

said first output is driven high and said second output is grounded for a positive logical one drive value;

said second output is driven high and said first output is grounded for a negative logical one drive value; and said first output and said second output are grounded for a zero logical drive value.

7. An audio system of claim 6 wherein said speaker comprises a first speaker lead and a second speaker lead which are alternatively coupled to said first output and said second output depending upon said accumulated error, and intermediate values are achieved by pulsing said first speaker lead and second speaker lead.

8. An electronic processing system comprising:

a bus for communicating audio information;

a processor coupled to said bus, said processor for processing said audio information;

a memory coupled to said bus, said memory for storing said audio information; and an audio system coupled to said bus, said audio system for creating sounds by driving digital signals directly to a speaker, said audio system comprising:

a sample register for holding an audio sample;

an convergence adjustment component for calculating the error for each sample, said convergence adjustment component communicatively coupled to said sample register;

an accumulated error register for storing an accumulated error, said accumulated error register communicatively coupled to said convergence adjustment component;

a driver for driving a digital signal to a speaker, wherein said driver determines whether to drive a positive digital value, drive on a negative digital value or not drive a value to said speaker, said driver communicatively coupled to said accumulator error register; and a speaker for creating audio sounds based upon a signal from said driver, said speaker communicatively coupled to said driver.

9. An electronic processing system of claim 8 wherein said audio sample is a digitized sample of an analog audio signal and said sample register holds said audio sample for a sample period.

10. An electronic processing system of claim 8 wherein said convergence adjustment component is a free input adder that adds a previous error to a new error and said new error is determined by subtracting an input to said adder from an output of said adder.

11. An electronic processing system of claim 8 wherein said driver includes a first output and a second output and:

said first output is driven high and said second output is grounded for a positive logical one drive value;

said second output is driven high and said first output is grounded for a negative logical one drive value; and said first output and said second output are grounded for a zero logical drive value.

12. An electronic processing system of claim 8 wherein said speaker comprises a first speaker lead and a second speaker lead which are alternatively coupled to said first output and said second output depending upon said cumulative error.

* * * * *